[11] 3,548,093

[72] Inventor Winston E. Kock
c/o The Bendix Corporation Fisher Bldg., Detroit, Mich. 48202
[21] Appl. No. 691,908
[22] Filed Dec. 19, 1967
[45] Patented Dec. 15, 1970

[54] HOLOGRAM TELEVISION SYSTEM AND METHOD
20 Claims, 4 Drawing Figs.
[52] U.S. Cl. ..................................... 178/6.5, 178/6; 350/3.5
[51] Int. Cl. ....................................... H04n 9/54
[50] Field of Search ............................ 350/3.5; 178/6.5

[56] References Cited
UNITED STATES PATENTS
3,427,090 2/1969 Justh et al ..................... 350/3.5
3,444,316 5/1969 Gerritsen ....................... 178/6.5

OTHER REFERENCES
W. E. Kock "Hologram Television" Proc. IEEE(Letters) Vol. 54 p. 331 Feb. 1966

*Primary Examiner*—Richard Murray
*Assistant Examiner*—B. Leibowitz
*Attorneys*—John R. Manning, Herbert E. Farmer and Garland T. McCoy ABSTRACT: This invention relates to a device for reducing the information content of a hologram so as to permit it to be transmitted over a narrow bandwidth. The disclosed invention employs an array of tiny lenses for expanding or enlarging tiny samples of a hologram into coarse samples which can then be transmitted over a narrow bandwidth channel such as in a television system.

PATENTED DEC 15 1970

INVENTOR
Winston E. Kock
BY
J McCoy
John R. Manning

INVENTOR
Winston E. Kock

HOLOGRAM TELEVISION SYSTEM AND METHOD

Holograms require extremely fine resolution for their reproduction. Reproduction by ordinary television methods would require greatly excessive bandwidth. Reproduction of a small fraction of the total area of a full hologram as a sample comprising many tiny holograms which are discrete portions taken throughout the aperture of the hologram, is disclosed to require but the corresponding fraction of the bandwidth, yet to a viewer, the sample array of tiny holograms has much the appearance of the full hologram just as the view through a window screen retains much of the realism of an unobstructed view. Apparatus employing a photochromic glass plate to display the reconstructed image is disclosed with an array of thin lenses suitable for magnifying the samples for transmission and for reducing them upon reception.

The invention described herein was made by an employee of the U.S. Government and may be manufactured and used for or by the Government for governmental purposes without the payment of any royalties thereon or therefor.

This invention relates to holograms and particularly to hologram television. Holograms are transparencies, which, when illuminated with laser light from the rear, provide to a viewer in front of the hologram a three-dimensional image. Because of these requirements of transparency and laser illumination, holograms (the hologram effect) cannot be produced with the present type of television viewer, the cathode ray tube. Light emitted from the different parts of the cathode ray phosphor is not coherent; moreover the resolution of the conventional television process (525 lines per inch) is about 100 times too coarse to reproduce the interference fringes which carry the information of a hologram. Holograms are discussed at length in a tutorial article by Leith and Upatnicks appearing in Scientific American for June 1965 page 24. Referring to hologram television the authors write: "It is possible in principle to produce a hologram television system, since a hologram can be recorded on the photosensitive surface of a television camera just as readily as on a photographic emulsion. Moreover, the hologram data can be transmitted and reconstructed in a receiver. Such a system would produce virtually the ultimate realism."

"When the required system and component specifications are examined, however, it is found that they greatly exceed the present state of the art. Transmission bandwidths exceeding present television bandwidths by factors of several hundred are required, unless design comprises are made that result in a partial loss of the dramatic results attainable from holograms. Cameras, picture tubes and associated components must also be much better than present-day equipment. In addition, the objects would have to be illuminated by laser light, and the receiver similarly would have to contain a laser; present lasers are inadequate for these tasks and would require improvement. The potential is great but the price is still quite high. Methods are being sought for reducing the stringent requirements on system bandwidths, with some initial success, but much remains to be done." And the authors further note: "A hologram made in the manner just described has several interesting properties in addition to those having to do with its three-dimensional nature of its reconstruction. As an example, each part of the hologram, no matter how small, can reproduce the entire image. Thus the hologram can be broken into small fragments each of which can be used to construct a complete image. As the pieces become smaller, resolution is lost, since resolution is a function of the aperture of the imaging system. This curious property is explained on the basis [that each] point on the hologram receives light from all parts of the object and therefore contains in an encoded form, the entire image."

The authors further note: "Another interesting property of wave-front reconstruction photography is that the reconstructed image has very nearly the same contrast rendition as the original subject regardless of the contrast properties of the photographic emulsion. Thus, high contrast plates, which in ordinary photography would be useful only for such objects as line drawings, can be used without losing any of the tonal properties of the object. The photographic plate containing the hologram may be capable of registering only two levels of density, transparent and opaque, but the tonal rendition of the reconstruction does not suffer. This mysterious property of the wave-front reconstruction photography is not easily explained, but it is again related to the use of the carrier and also the fact that each point of the object is recorded not on a single point of the hologram but on the entire hologram. Under these circumstances it can be shown that the failure to preserve a proper gray scale produces, as its main effect higher order defracted waves. The first order defracted waves, which produce the reconstructed images, are to at first approximation unaffected by the distortion of the gray scale."

To achieve hologram television in accordance with the present invention, newer and different picture tube processes are required which are compatible with the use of laser light. Two processes which have been developed, for example, are the ediphor and photochromic glass techniques. In the ediphor process, an electron beam, instead of causing a brightening of the phosphor as in a cathode ray tube, causes a surface to become more or less transparent, depending upon the strength or intensity of the electron beam. The light which forms the television picture in the ediphor process is produced by a bright light shining on the back of the surface. Depending upon the amount of transparency generated by the electron beam, the viewer sees more or less light on the ediphor surface and this sees the effect of a picture (in two dimensions of course). The ediphor effect appears and decays extremely quickly.

In the photochromic process, it is the amount of light, rather than the strength of an electron beam which affects the transparency of the glass. The glass is darkened by exposure to near ultraviolet light, is bleached by exposure to red and infrared light and is unchanged by green light, termed a neutral wave wavelength. Thus an image may be recorded by red or violet light, (depending upon whether a positive or a negative is desired) and nondestructively read-out by a green light which may be of laser origin. At the present stage of development the photochromic process does not permit as rapid frame rates as, for example, the ediphor effect, however the photochromic field is developing very rapidly and the response time has been reduced tremendously in the last few years.

An important feature of a hologram is that as a viewer moves his head, the perspective changes. To exploit this effect, the aperture filled by the hologram must be large compared to the separation of the human eyes, and must subtend an appreciable angle from the scene. Hologram television, accordingly requires appropriately large display screen size. The fringes which make up the hologram have the same close spacing independent of the size of the hologram. Accordingly the information required to reproduce a hologram is proportional to its area, in contrast to conventional television pictures wherein information content is substantially the same for small or large-screen sets.

It is a general object of the present invention to provide television holograms requiring much less bandwidth, but with a minimum reduction in realism. The above objects are achieved by the employment of an unique sampling system and apparatus whereby a large, full-fidelity hologram of a scene is replaced by a plurality of small holograms taken as samples distributed across the area of the large hologram but with the area of the samples aggregating much less than the area of the full-fidelity hologram and accordingly containing a proportionally reduced amount of information. For reconstruction of the image at the receiver a corresponding array of tiny holograms is displayed. These samples being separated much as the individual color dots on a picture tube are separated by too small a distance to be resolved by the eye of the viewer are imperceptible. This is a separation of about 1 milliradian or less measured from the viewer. Viewing a hologram has been likened to viewing a scene through a window. With the present invention the viewer sees the scene as viewed through a window with a window screen.

A feature of the invention by which the desired objects are attained is the use of a plane array of small, long-focal-length lenses which is employed at the transmitter in conjunction with a light source to record on a photosensitive surface (e.g. orthicon screen) enlarged images of a small samples taken over an extended wave front reproduction, and at the receiver to recreate the samples and their spacing by reducing enlarged images to spots on a photochromic or ediphor surface which are illuminated by a laser to recreate the scene.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
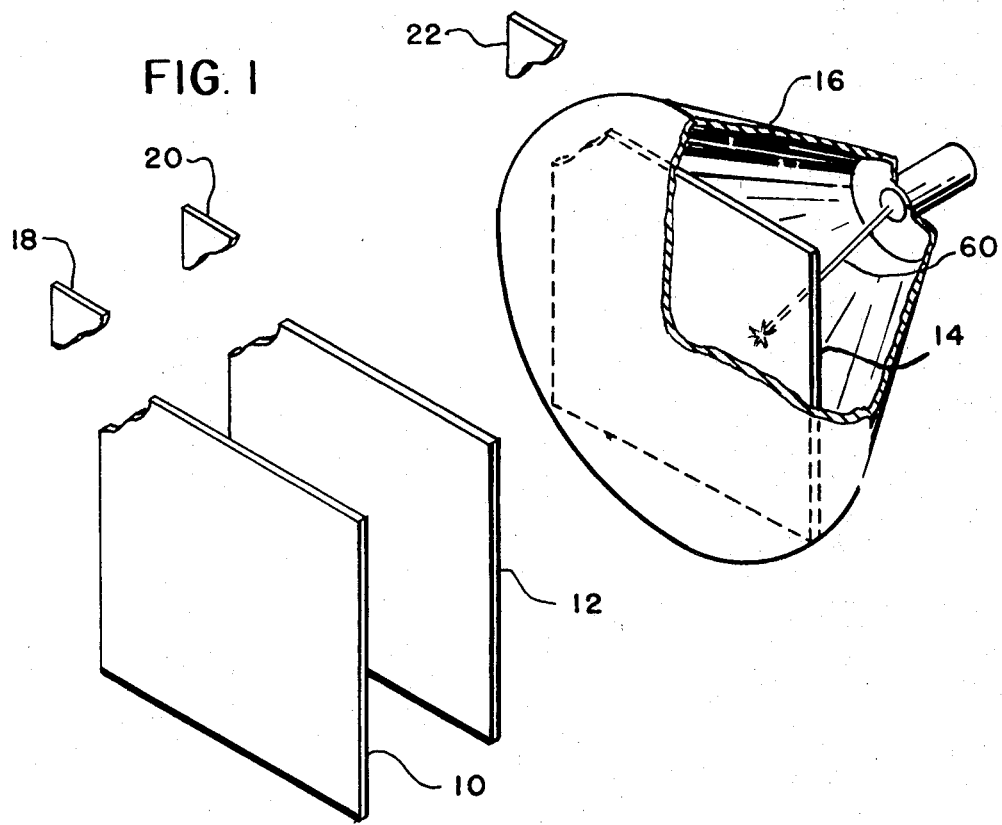
FIG. 1 is a diagram of the hologram sampling technique.

FIG. 1 shows the arrangement of a hologram-bearing photochromic glass plate 10, a lens array 12, and the sensitive screen 14, of a television camera tube 16. Portions 18, 20, and 22 are shown enlarged respectively in FIG. 2.

Figure 2:
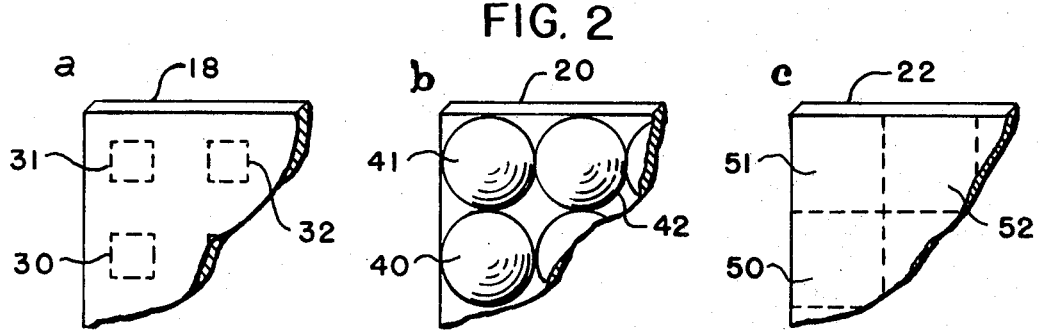
FIG. 2 is an enlargement of portions of the arrangement of FIG. 1.

For full hologram reproductions extremely fine resolution of detail is required, and the image, if visible in the glass sheet 10, would require resolution of 2,000 to 3,000 lines per millimeter. The fringe patterns are indicated symbolically in the enlarged part 18 in FIG. 2. Within the section 18 are sample spots 30, 31 and 32. For each sample hologram in the hologram plate 10 there is in the array 12 a corresponding thin lens section, of which three, 40, 41 and 42 are illustrated in FIG. 2. Each of these lenses 40, 41 and 42 focuses an enlarged view of a hologram sample spot onto the sensitive plate 14. Thus the lens 40 focuses the spot 30 at a predetermined area 50 of the sensitive screen, spot 31 is enlarged by a lens 41 at its assigned place 51 and an enlargement of sample 32 is projected by the lens 42 to a different area 52. For maximum transmission efficiency, the enlarged images 50, 51, 52 etc. on the screen substantially fill the screen 14. It is neither necessary nor desirable that the samples 30, 31, 32 be uniformly and regularly spaced on the hologram 10; rather a degree of randomness should be introduced in the positioning of the lenses 40, 41, 42 — and the taking of the samples — to minimize undesirable effects which might appear if a regular array of samples were used to reproduce a scene which includes periodic structures such as a plaid skirt or a picket fence.

The spots are numerous, about 250,000 or more, spaced closely enough that excessive granularity is not apparent to the viewer. The spacing is about 1 milliradian or less measured as an angle from the viewer, viewer. The size of each spot must accommodate several fringes. The fringes may be separated by not less than half a wavelength nor more than a small number of wavelengths. Thus the spots must be at least of the order of 10 microns in height and width.

Applied to a viewing screen or aperture half a meter square viewed at a distance of one meter, spots are 1 millimeter apart, at least 250,000 spots on the screen. If each spot is 10 microns wide and 10 microns high the total area of these spots (each of $10^{-4}mm^2$) is 25 square millimeters, only 1 percent of 1 percent of the area of the screen, and a corresponding reduction in the required communication bandwidth is affected. The resulting approximation of the scene may be made progressively better by increasing both the size and number of the spots. Bandwidth reduction remains substantial, so long as the aggregate area of the spots is a small fraction of the area of the total viewing aperture.

The magnified images 50, 51, 52 thus projected on the screen 14 are scanned by an electron beam 60 and transmitted by conventional electronic means as well known in the art.

Photochromic glass is described in an article in "Applied Optics" for June 1966 Vol. 9 No. 6 "Optical properties and Applications of Photochromic Glass" by G. K. Meggla. Photochromic glass contains small silver halide crystals that are precipitated from the homogenius glassy matrix during the glass formation. Upon activation with light of relatively high frequency the silver is precipitated proportionally to the exposure and the glass darkens. The halide which is released in the process is trapped in the glass and upon removal of the activating illumination recombines with the silver. The recombination of the halide and the silver is accelerated by illumination of the glass by a somewhat lower wavelength light. Thus, for a silver chloride photochromic glass optimum activation occurs at a wave length of about 350 millimicrons while optimum bleaching occurs at wave lengths between 550 millimicrons and 650 millimicrons.

Photographic images may be formed which are either negative or positive depending upon the wave length chosen for exposure. If the higher frequency activating light is selected for exposure, a negative image results, the greater the illumination the darker the resulting plate. The plate is prepared for exposure by bleaching with lower frequency light and/or the application of heat. On the other hand the plate may be prepared for exposure by fully activating with high frequency light and exposing with the optimum bleaching frequency. Since positive and negative holograms are equivalent either mode of operation may be used.

Figure 3:
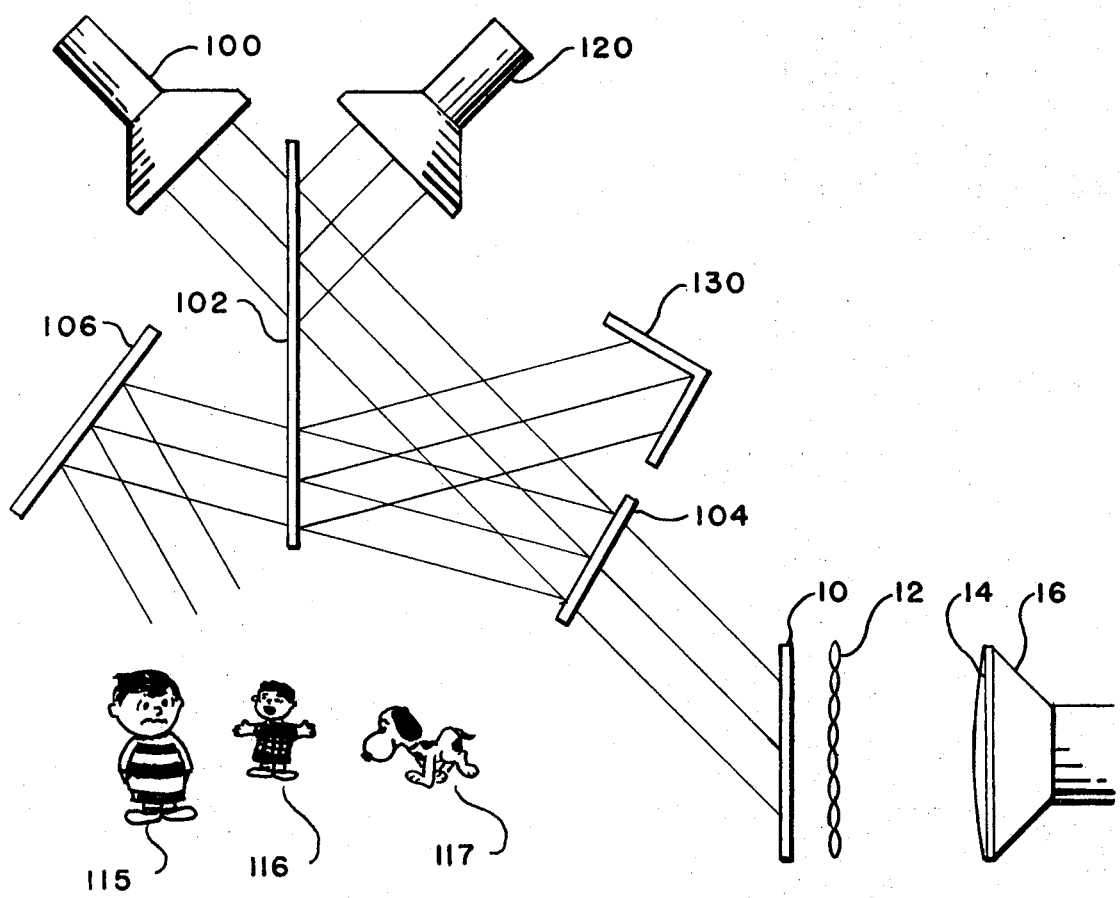
FIG. 3 is a schematic diagram of a hologram television transmitting system in accordance with the invention.

FIG. 3 shows the arrangement at the sending end of a television system employing this sampling scheme. The image-receiving photosensitive plate 10 is situated to have the desired aspect for viewing the scene. A powerful pulse laser 100 of the bleaching frequency about 400 millimicrons wave length is directed through a dicroic mirror 102 and a beam splitting mirror 104 and impinges as a reference beam against the hologram plate 10. The greater part of the beam is reflected from the beam splitter 104 against the mirror 106 to illuminate the scene and the actors 115, 116, 117. The beam splitting plate 104 is fully silvered except for a large number of tiny apertures corresponding to the tiny hologram samples which 31, 32, etc. on plate 10. These apertures which may be slightly silvered) allow the reference beam to impinge upon the photochromic glass only at the predetermined sampling points (and a small margin around each of them to minimize edge effects).

A second laser 120 provides an erase beam for activating the hologram plate 10 prior to the formation of each successive hologram. Light from this laser 120 is reflected from the dicroic reflector 102, which is coated to reflect the high frequency activating rays and to pass the lower frequency bleaching rays through the apertures in screen 104 to the plate 10. That portion of the erase beam which does not pass through the screen 104 is reflected back to the dicroic mirror 102 then against a retroreflector 130 thence back toward the laser 120.

The sequence of operations in each television frame is as follows:

(1) The activating laser 120 is flashed darkening the glass plate 10 at the illuminated spots.

(2) Then the laser 100 is flashed producing a hologram in the plate 10. The power of the pulse is sustained long enough to develop the hologram image in the plate 10.

(3) the image is then transferred by the lens array 12 to the sensitive screen 14 of a television camera tube 16 such as an image orthicon.

(4) The camera tube stores the matrix of enlarged holograms while the electron beam 60 scans the pattern and converts the image to electrical impulses in the well known manner.

Figure 4:
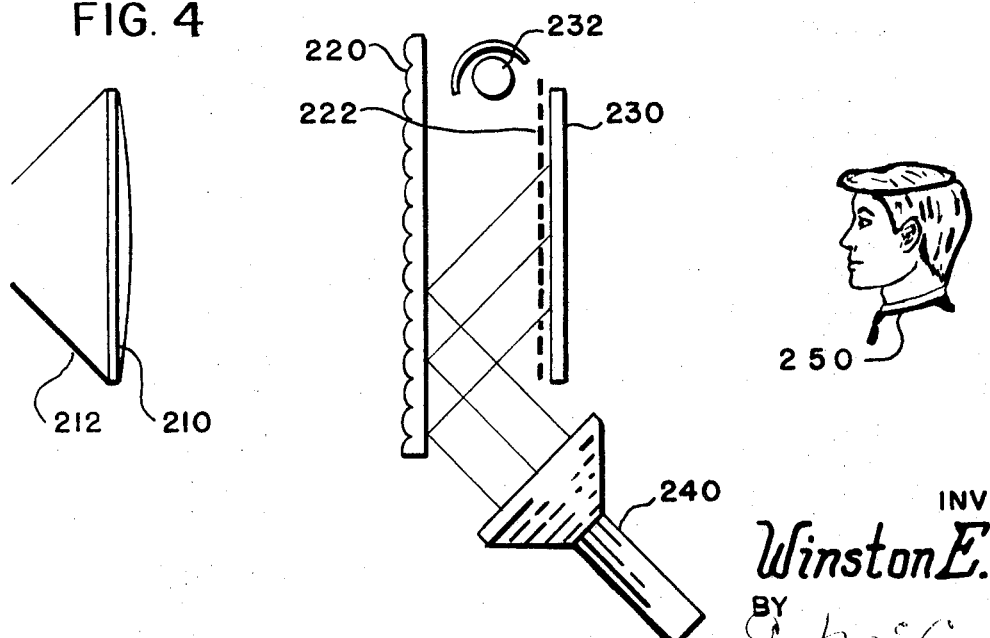
FIG. 4 is a schematic diagram of a hologram television receiving set for use in conjunction with the apparatus of FIG. 3.

(5) The electrical impulses are sent to the receiving station of FIG. 4 by any conventional means.

At the receiver the matrix of enlarged tiny holograms is reproduced on the face 210 of a cathode ray tube 212. The phosphor is selected to emit the bleaching frequency. These images are transferred during full frame time by the lens array 220 through a mask 222 to a second photochromic glass plate 230. At the beginning of each frame, the photochromic glass is activated by flashing an ultraviolet tube 232. At the end of the frame scan, a laser 240 is flashed which has the same frequency the same angle of incidence as the laser 100. Upon the flashing of the laser 240 the 1 hologram of the scene becomes visible by the viewer 250.

The invention has been described with reference to a preferred embodiment wherein an array of long focal length lenses magnifies and reduces optical images. It will be clear that a multiapertured electron lens may be used in place of the array of optical lenses in a suitably modified arrangement of the transmitting or the receiving equipment or in both. Since an electrostatic electron lens may be but a series of holes in metal an alternative transmitting arrangement might incorporate a modified image orthicon tube wherein the hologram of the scene is formed by interference of the laser beams at the photo cathode; and wherein immediately behind the photocathode are located one or more apertured metal plates comprising the lens array whereby electrons, not from the entire photo cathode, but from restricted portions thereof are intensified and imaged on the target screen of the tube. The use of electron lenses offers additional system flexibility because the lenses can be scanned. Each lens might handle several sample holograms; which would be scanned for transmission by the electron beam a group at a time. Lens scanning would permit the equivalent of the interlace scanning familiar in television. Electron lenses have the disadvantage that they are not inherently fixed and would require precise focusing controls.

It will thus be seen that the objects set forth above among those made apparent from the preceding description are efficiently obtained. Since certain changes may be made in carrying out the described method and in the apparatus disclosure without departing from the scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be a said to fall therebetween.

I claim:

1. A system for reducing the bandwidth of a hologram to permit transmission by conventional television to reproduce a realistic approximation of a scene as viewed through a large aperture at a particular aspect comprising:
   a. a photosensitive first-image plate capable of holographic retention situated to occupy said aperture;
   b. means for delineating from the scene a pattern of spots on said plate;
   c. said spots aggregating in area a small fraction of the area of said aperture;
   d. each extending may wavelengths in each dimension, separated from adjacent spots by an amount not readily perceptible to the intended viewer of said approximation;
   e. monochromatic lighting means cooperating with said means for delineating for impinging on each of said spots a small hologram of said scene, a second image plate forming the sensitive surface of a camera tube; and
   f. a plurality of lenses positioned between said first and second image plates and arranged for projecting enlarged images of said holograms on said second image plate to fill a relatively large fraction of the area of said second plate with a second spot pattern.

2. The apparatus as defined by claim 1 in further combination comprising receiving means including:
   a. a third image plate forming the sensitive surface of a television receiving tube;
   b. means for making a reproduction of said second spot pattern on said third image plate;
   c. a fourth image plate;
   d. an array of lenses similarly arrayed to said plurality, situated between said third and fourth image plates to form spot images on said fourth plate of said small holograms sized and spaced as said spots are delineated on said first image plate; and
   e. monochromatic means for lighting said spot images to render visible to a viewer a realistic approximation of said scene.

3. Apparatus as defined by claim 1 wherein said spots each have an area of at least $10^{-4}$ square millimeters and wherein the separation of adjacent spots subtends an angle of not more than 3 milliradians measured from the eye of said viewer.

4. Apparatus as defined by claim 1 wherein said plurality of lenses comprise a pan array of small long-focal-length lenses.

5. Apparatus as defined by claim 1 wherein said first plate comprises photochromic glass.

6. Apparatus as defined by claim 1 wherein said first plate comprises an eidophor surface.

7. Apparatus as defined by claim 2 wherein said spot images have an area of at least $10^{-4}$ square millimeters and wherein the separation of adjacent ones of said spot images subtends an angle of not more than 3 milliradians measurement from the eye of said viewer.

8. Apparatus as defined by claim 2 wherein said array is of small, long-focal-length lenses.

9. Apparatus as defined by claim 2 wherein said fourth plate comprises photochromic glass.

10. Apparatus as defined by claim 2 wherein said fourth plate comprises an eidophor surface.

11. The method conserving bandwidth in the electronic transmission of a hologramlike representation of the view through an aperture comprising the steps of:
   a. recording in said aperture at a first instant a large number of tiny holograms distributed throughout said aperture but aggregating in area a small fraction of the area of said aperture;
   b. projecting enlargements of said holograms through an array of lenses to form a pattern substantially covering an image-holding surface;
   c. transmitting said pattern by television means;
   d. receiving said pattern; and
   e. projecting said pattern on a viewing screen to form reduced tiny latent images sized as said tiny holograms and distributed on the viewing screen approximately equal in dimension to said aperture.

12. A photographic process for reducing the number of interference fringes of a hologram hologram recorded on a photographic plate comprising the steps of:
   a. employing a plane array of a number of long-focal-length lenses in conjunction with a light source to record on the photographic plat an a image focused by said lenses and representing only those portions of the original image focused by said array of lenses and equal to the number of small samples of the image picked up by said lenses, such samples of the original image including several wave interference fringes and spaced as to achieve a reduction in the resolution of the pattern on the photographic plate;
   b. developing said pattern; and
   . projecting said pattern by means of an array of said number of to form on a surface said number of said samples distributed over said surface.

13. A reduced bandwidth holographic television system for providing a realistic approximation of a scene comprising, an image plate capable of holographic information retention, means for repetitively forming a hologram of a scene on said image plate, a camera tube, and means positioned between said image plate and said camera tube for reducing the information content of the hologram; a said last means being an array of lenses for enlarging portions of the hologram on the image plate so that the information is accommodated with respect to the resolution of said camera tube.

14. The television system as defined in claim 13 wherein the lenses of said array of lenses are of long focal length.

15. The television system as defined in claim 13 wherein the lenses of said lens array are randomly positioned in said array.

16. A reduced bandwidth holographic television system for viewing a realistic approximation of a transmitted holographic scene comprising a CRT having a matrix of enlarged tiny holograms successively reproduced upon its face plate, an image plate capable of holographic information retention, a mask having a plurality of apertures therein positioned between said image plate and said CRT and adjacent said image plate, means positioned between said CRT and said mask for enlarging the information content of a hologram on said face plate and through said mask before retention by said image plate, and optical means for alternately activating said image plate and a hologram on said image plate, said means for enlarging being an array of lenses for reducing the fringe pattern along the CRT beam trace to that which approximates the fringe pattern on an untransmitted hologram.

17. A picture transmission method for transmitting successively formed holograms with a reduced bandwidth via conventional television transmitting methods system comprising the steps of:
   positioning a hologram-receiving plate before a scene to be transmitted;
   delineating a portion of the scene on the plate in the form of a large number of spots;
   the spots aggregating in area a small fraction of the scene and each spot including a plurality of interference fringes;
   magnifying the interference fringes of the spots on the plate through an array of tiny lenses, a lenses for each spot, to an area which approximates the area of the receiving plate; and
   positioning a camera tube to receive the magnified interference fringes of the spots, the number of interference fringes of the spots now comprising a bandwidth capable of transmission by conventional television transmission methods.

18. The method as defined in claim 17 including the steps of alternately reactivating the receiving plat plate and pulsing the receiving plate with a laser beam.

19. A picture receiving method for receiving successively formed hologram with a reduced bandwidth transmitted via a conventional television transmitting system comprising the steps of:
   forming a scene, made up of a plurality of magnified spots of holographic interference fringes, on the face of a television receiving tube;
   the spots aggregating in area a small fraction of the hologram of the original scene;
   positioning a hologram receiving plate in front of the receiving tube;
   demagnifying the plurality of spot areas of the scene by an array of lenses positioned between the tube and the receiving plate; and
   aligning a mask of apertures between the array of lenses and receiving plate, a lens aligned with an aperture, for delineating the spots to produce a realistic approximation of a scene being televised.

20. The method as defined in claim 19 including the steps of alternately activating the receiving plate at the beginning of a television frame and pulsing the plate with a laser beam to cause the scene to be displayed.